(12) United States Patent
Ohshida et al.

(10) Patent No.: US 8,236,275 B2
(45) Date of Patent: Aug. 7, 2012

(54) PROCESS FOR PRODUCING CARBON MATERIAL AND ALKALI ACTIVATION APPARATUS

(75) Inventors: Takuo Ohshida, Kanagawa (JP); Koichi Kanno, Okayama (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 837 days.

(21) Appl. No.: 11/912,777

(22) PCT Filed: Apr. 27, 2006

(86) PCT No.: PCT/JP2006/308858
§ 371 (c)(1),
(2), (4) Date: Feb. 23, 2009

(87) PCT Pub. No.: WO2006/118204
PCT Pub. Date: Nov. 9, 2006

(65) Prior Publication Data
US 2009/0214412 A1     Aug. 27, 2009

(30) Foreign Application Priority Data
Apr. 28, 2005   (JP) ................. 2005-131932

(51) Int. Cl.
*C09C 1/56*   (2006.01)
*B01J 19/00*  (2006.01)
*C01B 31/08*  (2006.01)

(52) U.S. Cl. ........ 423/460; 422/198; 502/427; 502/428; 502/429

(58) Field of Classification Search .................. None
See application file for complete search history.

(56) References Cited

U.S. PATENT DOCUMENTS

| | | | | | |
|---|---|---|---|---|---|
| 4,131,418 | A | * | 12/1978 | Kramm et al. | ............. 432/80 |
| 2002/0052293 | A1 | | 5/2002 | Tsuruya et al. | |
| 2005/0181941 | A1 | * | 8/2005 | Sugo et al. | ............. 502/427 |

FOREIGN PATENT DOCUMENTS

| | | |
|---|---|---|
| JP | 2000-128518 | 5/2000 |
| JP | 2001-019415 | 1/2001 |
| JP | 2004-018292 | 1/2004 |

OTHER PUBLICATIONS

Translation of JP 2004-018292.*
International Search Report, PCT/JP2006/308858, Jun. 5, 2006.

* cited by examiner

*Primary Examiner* — Melvin C Mayes
*Assistant Examiner* — Guinever Gregorio
(74) *Attorney, Agent, or Firm* — Antonelli, Terry, Stout & Kraus, LLP.

(57) ABSTRACT

Provided is a production process for a carbon material comprising an alkali activation reaction step in which a carbon precursor containing an activator selected from alkali metal compounds is heated under flow of inert gas. The above alkali activation reaction is carried out while allowing carbon dioxide gas to flow into a downstream part of an alkali activation reaction region on the condition that the carbon dioxide gas is not substantially brought into contact with the carbon precursor and the activator. This makes it possible to carry out alkali activation treatment safely and stably and obtain a carbon material useful for producing an electric double layer capacitor electrode having a high electrostatic capacity.

9 Claims, 1 Drawing Sheet

PROCESS FOR PRODUCING CARBON MATERIAL AND ALKALI ACTIVATION APPARATUS

BACKGROUND OF THE INVENTION

The present invention relates to a process for producing a carbon material for producing an electric double layer capacitor electrode and the like and an alkali activation apparatus.

RELATED ART

At present, activated carbons having a high specific surface area obtained by activating palm husks, cokes, phenol resins and the like with steam, carbon dioxide and the like are used as a polarizable electrode material for an electric double layer capacitor (EDLC). However, when the activation degrees are elevated in order to obtain activated carbons having a high specific surface area which make it possible to provide the high electrostatic capacity from the above raw materials, there has been the problem that a bulk density of the electrode material is reduced to make it impossible to enhance an energy density of EDLC.

Accordingly, disclosed is a process for obtaining activated carbons which make it possible to provide the high electrostatic capacity from easily-graphitizable carbons such as cokes, mesocarbon microbeads, mesophase pitch base carbon fibers and the like by activation (hereinafter referred to as alkali activation) using alkali metal compounds (refer to, for example, patent documents 1 to 3). Further, it is disclosed that excellent activated carbons for EDLC are obtained by subjecting a specific pitch raw material to heat treatment and activation treatment, and it has become clear that selection of starting materials used for the alkali activation and selection of the treating conditions are important for obtaining activated carbons which make it possible to provide the high electrostatic capacity (refer to, for example, a patent document 4).

On the other hand, involved therein is the problem that when the alkali activation described above is put industrially into effect, alkali metals (for example, potassium) and alkali metal compounds (for example, potassium oxide) which are produced during activation reaction (activation treatment) are scattered and deposited onto an inside of a reactor and exhaust lines and that involved therein is the large risk that they are reacted with moisture in the air when taking out activated products to bring about ignition and explosion.

A method in which carbon dioxide gas is allowed to flow in a system in a cooling step after finishing activation treatment to turn the alkali metals and the alkali metal compounds each described above into alkali metal carbonates (for example, potassium carbonate) to thereby stabilize them is considered as means for solving the problem described above. However, it has been found that in the above method, when the alkali metals and the alkali metal compounds produced grow gradually at specific sites of a reactor and insides of pipelines at an exhaust side at which deposition is liable to take place and are adhered thereon in the form of lumps, reaction with carbon dioxide gas is not spread up to the insides of the lumps in prescribed time and that there is a high risk of bringing about accidents such as ignition during a work of taking out the activated products.

It is disclosed that introduction and flowing of carbon dioxide gas in a specific concentration in an inside of an activation reaction system during activation reaction as a method for solving the problem described above make it possible to avoid the risk of ignition and explosion (refer to, for example, a patent document 5).

According to investigations made by the present inventors, however, alkali metals and alkali metal compounds which are present or produced in an activation reaction system are reacted with carbon dioxide gas regardless of a concentration of the carbon dioxide gas, and a capacitor using the carbon material obtained is reduced in an electrostatic capacity. Accordingly, it has become apparent that the presence of carbon dioxide gas in an activation reaction system during activation reaction is not preferred.

Patent document 1: Japanese Patent No. 2548546
Patent document 2: Japanese Patent No. 2634658
Patent document 3: Japanese Patent No. 3149504
Patent document 4: Japanese Patent Application Laid-Open No. 93667/2002
Patent document 4: Japanese Patent Application Laid-Open No. 18292/2004

DISCLOSURE OF THE INVENTION

As described above, the problem that a carbon material having a high electrostatic capacity can not be safely produced in an industrial scale has been involved in conventional production processes carried out by alkali activation treatment. An object of the present invention is to provide a production process in which alkali activation treatment is carried out safely and stably and in which a carbon material useful for producing an EDLC electrode having a high electrostatic capacity is safely produced in an industrial scale.

Intensive investigations repeated by the present inventors in order to solve the problems described above have resulted in finding that alkali activation reaction in which a carbon precursor containing an activator selected from alkali metal compounds is heated under flow of inert gas is carried out while allowing carbon dioxide gas to flow to a downstream part of an alkali activation reaction region under the condition that the above carbon precursor and the above activator are not substantially brought into contact with the carbon dioxide gas, whereby a carbon material having a high electrostatic capacity per volume and per weight can be obtained safely and stably, and thus the present inventors have reached the present invention.

That is, the present invention provides a production process for a carbon material comprising an alkali activation reaction step in which a mixture of a carbon precursor and an activator selected from alkali metal compounds is heated under flow of inert gas in an alkali activation region, wherein the above alkali activation reaction is carried out while allowing carbon dioxide gas to flow to a downstream part of the above alkali activation reaction region on the condition that the carbon dioxide gas is not substantially brought into contact with the above carbon precursor and the above activator. Further, the present invention provides an alkali activation apparatus which can be used for the production process described above.

BEST MODE FOR CARRYING OUT THE INVENTION

Figure 1:
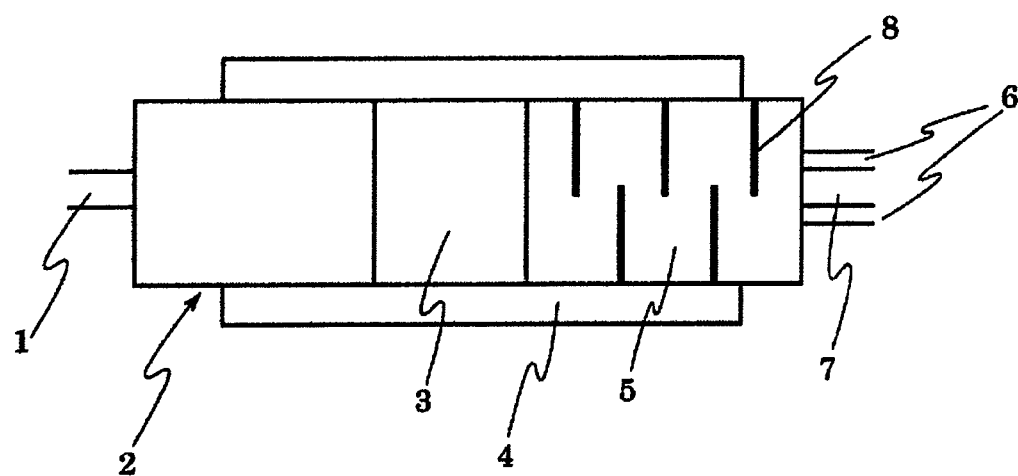
FIG. 1 is a schematic drawing showing an alkali activation apparatus using a rotary kiln furnace.

The present invention shall be explained below in details, but the present invention shall not be restricted to the following descriptions.

(1) Raw Material for a Carbon Precursor

Materials producing carbons by heat treatment such as thermosetting resins, pitches and the like, cokes, coals and the like can be used as a raw material for the carbon precursor used in the present invention. Among them, synthetic pitches obtained by polymerizing condensed polycyclic hydrocarbons or materials containing the same under the presence of hydrogen fluoride and boron trifluoride can suitably be used.

The synthetic pitches described above are considered to be polymers obtained by polymerization through cations produced by adding protons to condensed polycyclic hydrocarbons, and they have a high structural uniformity and a high purity as compared with conventional pitches. Also, they are distinguished from conventional pitches in terms of having the characters that they have a low softening point and a high solubility in solvents because of a lot of aliphatic hydrogens contained in the pitches produced. A carbon precursor prepared from synthetic pitch having the above characteristic structure has a high purity and is readily activated, and it forms an even porous structure. As a result thereof, it is a carbon material having a high electrostatic capacity and therefore is very excellent as a raw material for a carbon precursor.

A production process for synthetic pitch shall not specifically be restricted, and it can be obtained by polymerizing a pitch raw material such as condensed polycyclic hydrocarbon or a material containing the same under the presence of, for example, hydrogen fluoride and boron trifluoride. Capable of being used as the condensed polycyclic hydrocarbon are, as shown in Japanese Patent No. 2931593, Japanese Patent No. 2621253 and Japanese Patent No. 2526585, naphthalene, monomethylnaphthalene, dimethylnaphthalene, anthracene, phenanthrene, acenaphthene, pyrene, condensed polycyclic hydrocarbons having skeletons of the above compounds, mixtures of the above condensed polycyclic hydrocarbons and materials containing the above condensed polycyclic hydrocarbons. Among them, preferred are condensed polycyclic hydrocarbons selected from naphthalene, monomethylnaphthalene, dimethylnaphthalene and anthracene and mixtures thereof which are available at relatively low prices.

The polymerization reaction is carried out by using 0.1 to 20 mole of hydrogen fluoride and 0.05 to 1.0 mole of boron trifluoride as a polymerization catalyst per mole of a pitch raw material and carrying out reaction at a temperature of 100 to 400° C. for 5 to 300 minutes. Then, it may be heated at a temperature of 250 to 400° C. under nitrogen flow to thereby remove low boiling matters. In particular, a carbon material suited to an electric double layer capacitor electrode can be produced from mesophase pitch synthesized at a reaction temperature of 200° C. or higher, and it has a high carbonization yield. Accordingly, it is preferred.

(2) Production of Carbon Precursor

The carbon precursor is produced by a process in which the raw material for the carbon precursor described above is subjected to carbonization treatment carrying out heat treatment under stirring or in the state of leaving standing still (in the present specification, treatment in which pitch and the like are subjected to heat treatment to obtain pitch having properties suited to a carbon precursor is called carbonization treatment) or in which a powdery or fibrous raw material for a carbon precursor obtained by crushing treatment or melt spinning is subjected to oxygen addition to make it infusible and then to carbonization treatment.

Among them, a production process for a carbon precursor in which plural granular matters having a true density of 2 g/cm³ or more are charged into a heat treating equipment and in which a raw material for a carbon precursor is supplied to the above heat treating equipment while allowing the granular matters to flow and subjected to heat treatment to adhere a carbonized product of the raw material for the carbon precursor onto the above granular matters, is excellent in terms of simplicity of the equipment and the characteristics of the carbon material obtained.

The heat treating equipment described above shall not specifically be restricted as long as it can be used at 400° C. or higher and the granular matters charged into the equipment flow. It may be either a vertical type or a horizontal type, and the equipment having a stirring mechanism such as stirring blades, a spiral and the like may be employed. A heat treating equipment of a rotary kiln type which is simple and readily industrialized is particularly suitably used.

The granular matters described above are used as heat transfer media and/or moving media and have a true density of 2 g/cm³ or more. When the above granular matters are not present, a carbonized product in the heat treating equipment tends to be heterogeneous in the vicinity to a heat transfer surface, and lumps of the firm carbonized product are liable to be produced on the heat transfer surface, resulting in troubles of operation. Employing granular matters having a true density of less than 2 g/cm³ often results in forming lumps of the firm carbonized product, and an expensive stirrer is required in order to maintain the flow state. The shape of the granular matters shall not specifically be restricted as long as they do not have sharp parts, and the spherical matters and the oval-spherical matters are suitably used. More preferably, they are spherical matters usually used for the applications of ball mills and bearings which are industrially produced. The material of the granular matters shall not specifically be restricted as long as they have, as is the case with the material of the reactor, a corrosion resistance against inorganic gas produced and the raw material of the carbon precursor and are less liable to be broken while flowing. Usually, stainless steel, ceramics such as alumina and zirconia which are relatively inexpensive and have a high hardness are suitably used therefor. A size of the granular matters shall not specifically be restricted since the optimum size is varied depending on a size of the equipment, the operating conditions, the material of the granular matters and the like, and in the case of, for example, the spherical matters, they have a radius of preferably 1 to 100 mm, more preferably 5 to 80 mm and further preferably 10 to 50 mm from the viewpoint of a handling property.

The raw material of the carbon precursor is supplied to the heat treating equipment in which the plural granular matters described above flow while maintaining the temperature in a fixed range, whereby the carbonized product of the raw material of the carbon precursor is adhered onto the surfaces of the granular matters. The carbonization treatment may be carried out either by a continuous method in which supplying of the raw material of the carbon precursor and the granular matters and withdrawing of the granular matters having the carbonized product adhered thereon are carried out at the same time or by a semi-batch method in which after heating and allowing the granular matters to flow in advance and subsequently supplying a fixed amount of the raw material of the carbon precursor, the granular matters having the carbonized product adhered thereon are taken out. The raw material of the carbon precursor may be supplied either continuously or intermittently.

An amount of the granular matters charged into the heat treating equipment is varied depending on the type of the heat treating equipment and the kind of the granular matters, and it falls in a range of preferably 1 to 50 volume %, more preferably 1 to 40 volume % and further preferably 5 to 30 volume % based on a content volume of the heat treating equipment.

The carbonized product which is excellent in a handling property and is homogeneous can be obtained by allowing the carbonized product to be adhered onto the granular matters.

The heat treating temperature falls, though depending on the properties and the supplying speed of the raw material of the carbon precursor, in a range of preferably 400 to 800° C., and in the case of the synthetic mesophase pitch described above, it preferably falls in a range of 500 to 600° C. A rotating speed of the kiln and a stirring speed of the stirring blade shall not specifically be restricted since they are determined according to a size of the equipment and the properties and the supplying speed of the raw material of the carbon precursor. In the case of, for example, a heat treating equipment for a laboratory experiment equipped with a stirring blade having a content volume of 1 to 10 L, the stirring speed falls in a range of preferably 5 to 100 rpm, in the case of a rotary kiln having a content volume of 10 to 50 L, the rotating speed falls in a range of preferably 0.5 to 10 rpm, and in the case of a rotary kiln having a content volume of 50 L or more, the rotating speed falls in a range of preferably less than 2 rpm.

After finishing the carbonization treatment, the granular matters having the carbonized product adhered thereon are heated at a suitable temperature which is not lower than the heat treating temperature, whereby the carbonized product is readily separated from the granular matters. The granular matters separated from the carbonized product are circulated and reused.

The carbonized product separated from the granular matters is controlled to a suitable grain size, whereby a carbon precursor used for alkali activation treatment is obtained.

(3) Alkali Activation of Carbon Precursor

At least one of alkali metal compounds such as lithium hydroxide, sodium hydroxide, potassium hydroxide, potassium carbonate, potassium chloride and the like is used as an activator used for alkali activation. Among them, potassium hydroxide and/or sodium hydroxide are most preferred.

A use amount of the activator is preferably 0.5 to 10 times, more preferably 0.5 to 4.0 times and further preferably 1.5 to 2.5 times as heavy as the carbon precursor in terms of a weight ratio. If a weight ratio of the activator is less than 0.5 time, pores are not sufficiently formed in the carbon material obtained, and the electrostatic capacity tends to be reduced. On the other hand, if the activator is added in a weight ratio exceeding 10 times, not only an increase in the electrostatic capacity is not attained, but also a cost for an after-treating step such as neutralization is increased, and it is not preferred as well in terms of safety.

The alkali activation is carried out by mixing the carbon precursor and the activator homogeneously in the weight ratio described above, then heating the mixture from room temperature up to preferably 400 to 1000° C. under flow of an inert gas such as nitrogen and argon and maintaining the mixture at temperature falling in the above range preferably for 0.5 to 20 hours. If the activation reaction temperature is lower than 400° C., the reaction is less liable to proceed, and the activation degree is not enhanced. On the other hand, if the activation reaction temperature is higher than 1000° C., the reactor is heavily corroded due to deposition and scattering of alkali metals, particularly metal potassium. The activation reaction temperature is more preferably 500 to 950° C., further preferably 600 to 900° C.

Usually, the alkali activation described above is carried out by introducing a mixture of the carbon precursor and the activator into a reactor, such as a nicked-made, which not only has a high heat resistance but also is less liable to be corroded by alkali metals and heating the above reactor in a reaction furnace under flow of an inert gas such as nitrogen and argon.

The reactor used for the alkali activation shall not specifically be restricted as long as it is equipped with a gas introducing part for introducing an inert gas and a gas exhaust part for exhausting gas. For example, a reactor in which a mixture of the carbon precursor and the activator can be charged into a nickel-made tray or vessel and heated, may be employed.

The reaction furnace for heating the reactor may be either a batch type or a continuous type, and a box furnace, a belt furnace, a pressure furnace, a rotary kiln furnace and the like can be used. Among them, the rotary kiln furnace is suitably used because of the reasons that the carbon precursor and the activator flow and are mixed by rotation of the reactor, whereby the activation is evenly carried out and that the contact efficiency is good, as described later, in allowing carbon dioxide gas to flow in cooling to convert alkali metals and the like remaining in the activation region into safe substances (carbonates).

As described above, the alkali metals and the alkali metal compounds which are produced during the alkali activation treatment are scattered and deposited onto an inside of the reactor and the exhaust lines, and involved therein is the risk that they are reacted with moisture in the air when taking out the activated products to bring about ignition and explosion.

Accordingly, in the present invention, carbon dioxide gas is introduced into a downstream part of the alkali activation reaction region during the alkali activation treatment on the condition that the carbon dioxide gas is not substantially brought into contact with the activator and the carbon precursor which are present in the alkali activation region in order to reduce the risk of ignition and explosion of the alkali metals and the alkali metal compounds produced without reducing an electrostatic capacity of the carbon material. This allows the carbon dioxide gas to be brought into contact with the alkali metals and the alkali metal compounds produced which flow into a downstream part of the alkali activation reaction region to convert them into safe substances (carbonates). Further, the carbon dioxide gas is not substantially brought into contact with the activator and the carbon precursor, and therefore the foregoing problems on conventional techniques such as a reduction in the electrostatic capacity can be solved.

The alkali activation method of the present invention shall be described below in further details with reference to the drawings.

FIG. 1 is a schematic drawing showing one example of an alkali activation apparatus using a rotary kiln furnace. The alkali activation apparatus is constituted from a reactor 2 and a heater 4. The reactor 2 comprises a gas introducing part 1 for introducing an inert gas, an alkali activation region 3, a carbon dioxide gas flow region 5 and a double tube comprising an exhaust line 7 and an introducing line 6 for supplying carbon dioxide gas. Baffle plates 8 for controlling a flow amount of the carbon dioxide gas and preventing the carbon dioxide gas from flowing into the alkali activation region 3 are provided in the carbon dioxide gas flow region 5. The baffle plates may be provided as well in the introducing line 6 in addition to the carbon dioxide gas flow region 5 or only in the introducing line 6.

In the rotary kiln furnace, a rotating part is separated from a non-rotating part by a rotary joint and the like having an oil seal part. The introducing line 6 and the exhaust line 7 assume preferably, as shown in FIG. 1, a double tube structure in order to prevent powders and reactive gas from being mixed into the oil seal part. An outer tube in the double tube may be the exhaust line, and an inner tube in the double tube may be the introducing line, or the exhaust line and the introducing line may be independent two tubes. The position of the introducing line 6 shall not be restricted to the position shown as long as the carbon dioxide gas can be allowed to flow into the carbon dioxide gas flow region 5 without allowing it to flow into the alkali activation region 3.

A filling material such as a nonwoven fabric and the like can be used in place of the baffle plate for the purpose of preventing counter flow. In such case, the pressure loss is increased, and carbonates precipitated by the reaction of the alkali metals and the alkali metal compounds scattered with carbon dioxide gas are highly likely to be adhered locally to cause clogging. Accordingly, the baffle plates are preferably used.

After the alkali activation reaction is started, the alkali metals and the alkali metal compounds such as alkali metal oxides are produced and scattered. The alkali metals and the alkali metal compounds scattered are moved from the alkali activation region 3 to the carbon dioxide gas flow region 5 in a downstream by an inert gas introduced from the gas introducing part 1, and they are reacted with the carbon dioxide gas introduced from the introducing line 6 to produce carbonates. Introduction of the carbon dioxide gas from the introducing line 6 into the carbon dioxide gas flow region 5 is usually started at not lower than the temperature at which scattering of the alkali metals and the alkali metal compounds starts to take place (for example, 400° C.), and the introduction may be started from room temperature.

A flow amount of the inert gas introduced from the gas introducing part 1 is varied depending on a size, a structure, a form and the like of the apparatus. The gas introduced from the introducing line 6 may be carbon dioxide gas alone or carbon dioxide gas diluted with inert gas such as nitrogen, argon and the like. A flow amount of the gas introduced from the introducing line 6 and a concentration of the carbon dioxide gas are set, according to a flow amount of the inert gas introduced from the introducing part 1 and the structure of the baffle plate 8, to a range in which the carbon dioxide gas does not flow into the alkali activation region 3, that is, a range in which the activator and the carbon precursor are not substantially brought into contact with the carbon dioxide gas during the alkali activation treatment. A flow amount of the gas introduced from the introducing line 6 is preferably 0.01 to 200%, more preferably 0.1 to 150% and further preferably 1 to 100% based on a flow amount (in the case of, for example, the apparatus used in Example 1, 0.5 to 5 L/minute at 25° C.) of the gas introduced from the gas introducing part 1. If the gas flow amount is less than 0.01%, the reaction of the alkali metals and the alkali metal compounds scattered with the carbon dioxide gas can not follow the deposition speeds of the alkali metals and the alkali metal compounds, thus the safety may not be achieved. On the other hand, if the gas flow amount exceeds 200%, the activator and the carbon precursor are highly likely to be brought into contact with the carbon dioxide gas. Accordingly, either case is not preferred. The carbon dioxide gas is preferably introduced without diluting in order to allow the alkali metals and the alkali metal compounds scattered to be reacted sufficiently with the carbon dioxide gas without elevating the gas flow amount.

After finishing the alkali activation reaction, cooling is started while continuing to supply the inert gas from the introducing part 1 and the carbon dioxide gas from the introducing line 6. In order to convert the alkali metals and the alkali metal compounds scattered remaining in the alkali activation region 3 into carbonates, the inert gas introduced from the introducing part 1 is preferably switched over to carbon dioxide gas after an inner temperature of the reactor 2 is lowered to 400 to 200° C. The activated product is taken out after the inner temperature is lowered to 100° C. or less. Risks such as ignition and the like caused by the alkali metals and the alkali metal compounds remaining are avoided by carrying out the operations described above.

The activated product thus obtained is cooled down to room temperature, then washed with, for example, distilled water and/or a hydrochloric acid aqueous solution to remove the activator which is unreacted or reacted with carbon dioxide and sufficiently dried, whereby a carbon material can be obtained. Conventional methods can be used for washing with water and the subsequent steps thereof.

In the case of the carbon material for an EDLC electrode, an average particle diameter of the carbon material is controlled to a range of preferably 1 to 50 μm, more preferably 5 to 30 μm by subjecting it to crushing treatment and classifying treatment. The crushing treatment can be carried out as well at either stage of before the activation treatment (carbon precursor) and after the activation treatment (carbon material). The crushing machine is suitably selected from an impact type crushing machine, a jet mill, a microatomizer and the like, and the classifying machine is suitably selected from a mechanical classifying machine, a wind power classifying machine and the like.

The carbon material thus obtained has a high electrostatic capacity per volume, and use of electrodes prepared from the above carbon material provides EDLC having a high energy density and a high reliability.

EXAMPLES

Next, the present invention shall be explained in further details with reference to examples, but the present invention shall by no means be restricted by the following examples.

Example 1

Naphthalene was polymerized under the coexistence of hydrogen fluoride and boron trifluoride to synthesize mesophase pitch (Mettler method softening point: 280° C.).

An inner cylinder (content volume: 150 L, diameter: 580 mm) of a batch type rotary kiln equipped with a electrical heater was charged with 50 kg of zirconia-made balls (true density: 6 g/cm$^3$) having a diameter of 25 mm. The above mesophase pitch was supplied at a rate of 1 kg/hour for 3 hours at an internal temperature maintained constantly at 550° C. while rotating the kiln at 6 rpm. Subsequently, the rotary kiln was heated at 5° C./minute up to 700° C. and maintained for one hour. After left cooling, 2.4 kg of a carbonized product of the mesophase pitch was obtained by separating from the balls. The above carbonized product was crushed to an average particle diameter of 10 μm by means of an impact type crushing machine to obtain a carbon precursor.

An external heating rotary kiln type electric furnace comprising a cylindrical reactor 2 having an inner diameter of 165 mm and a length of 1650 mm and a heater 4 having a length of 1000 mm was used as an alkali activation apparatus, wherein the above reactor 2 was equipped with a rotary joint comprising a gas introducing part 1 at an upstream side and a double tube structure 6, 7 at a downstream side. The schematic drawing thereof was shown in FIG. 1.

Figure 2:
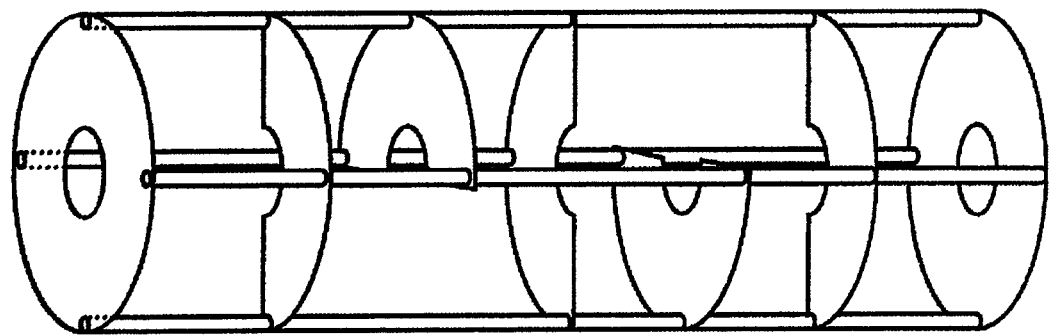
FIG. 2 is a schematic drawing showing baffle plates in which a notch part is disposed in a center.

A mixture of the carbon precursor 300 g and potassium hydroxide 540 g was put in an inner cylinder having an inner diameter of 160 mm and a length of 500 mm in which holes having a diameter of 30 mm were provided at both sides, and the above inner cylinder was set in a central part (alkali activation region 3) of the reactor in the rotary kiln. Further, five semicircular baffle plates 8 having an outer diameter of 160 mm in which a semicircular notch part having a radius of 10 mm was provided in a central part were installed in a carbon dioxide gas flow region 5 located at a downstream side of the inner cylinder at an interval of 50 mm as shown in FIG. 2.

Nitrogen was introduced at 2 L/minute from the gas introducing part 1, and the rotary kiln was rotated at ⅔ rpm. The kiln was heated from room temperature up to 390° C. at a rate of 3.3° C./minute and maintained at the above temperature for 3 hours to carry out dehydration. Then, carbon dioxide gas (concentration: 100 volume %) was introduced from an outside tube (introducing line 6) of the double tube into the carbon dioxide gas flow region 5 at a flow amount of 1 L/minute, and the kiln was heated from 390° C. up to 700° C. at a rate of 3.3° C./minute and maintained for 3 hours.

Thereafter, the kiln was cooled down to 200° C. while maintaining introduction of nitrogen and carbon dioxide gas, and then carbon dioxide gas (concentration: 100 volume %) was introduced at 2 L/minute from the gas introducing part 1 in place of nitrogen. After cooled down to 100° C. or lower, an activated product was taken out. In this regard, sparks and the like produced by reaction of remaining metal potassium or remaining potassium oxide with moisture in the air were not observed.

The activated product taken out was washed with water by stirring in distilled water, washed with 0.5N hydrochloric acid, and further washed three times with water and then dried at 150° C. to obtain a carbon material.

A mixture of the carbon material obtained, an electroconductive filler (Ketjen black) and a binder (registered trade name: Teflon) in a weight ratio of 90:5:5 was used to prepare an electrode. A paper-made separator was interposed between a pair of the electrodes, and it was put in an aluminum-made bipolar cell. Propylene carbonate in which 1.8 mole/liter of triethylmethylammonium tetrafluoroborate (($C_2H_5$)$_3CH_3NBF_4$) was dissolved was used as an electrolyte.

Charging was carried out up to a voltage of 2.7 V at a constant current of 100 mA/g at room temperature under argon atmosphere, and charging was further carried at 2.7 V for 2 hours. Then, discharging was carried out up to a voltage of 0 V at a constant current of 100 mA/g to calculate the electrostatic capacity from the energy amount discharged. The electrostatic capacity Cw (F/g) per weight was calculated based on a weight of the carbon material in both positive and negative electrodes. Further, the electrostatic capacity (F/cc) per volume was calculated by multiplying the electrostatic capacity Cw (F/g) per weight by a density of the electrode.

As a result thereof, shown were such excellent values as an electrostatic capacity of 34.8 F/g per weight, an electrostatic capacity of 32.7 F/cc per volume and an electrode density of 0.94 g/cc.

Comparative Example 1

The same operation as in Example 1 was carried out, except that carbon dioxide gas was not introduced from the outside tube (introducing line 6) of the double tube at 390° C. or higher, and observed were sparks produced by reaction of metal potassium or remaining potassium oxide which was deposited at a downstream part of the alkali activation region 3 with moisture in the air.

The electrostatic capacity per weight was 33.6 F/g; the electrostatic capacity per volume was 32.9 F/g; and the electrode density was 0.98 g/cc.

Comparative Example 2

The same operation as in Example 1 was carried out, except that nitrogen of 2 L/minute and carbon dioxide gas (concentration: 100 volume %) of 1 L/minute were introduced at the same time from the gas introducing part 1 at 390° C. or higher and that carbon dioxide gas was allowed to flow into the alkali activation region 3.

Sparks produced by reaction of metal potassium or remaining potassium oxide which was deposited at a downstream part of the alkali activation region 3 with moisture in the air were not observed in taking out, but the performances were reduced to such an extent as an electrostatic capacity of 28.0 F/g per weight, an electrostatic capacity of 26.6 F/cc per volume and an electrode density of 0.95 g/cc.

The results obtained in Example 1 and Comparative Examples 1 and 2 are summarized in Table 1.

TABLE 1

| | Carbon dioxide gas | | | Measurement results | | |
|---|---|---|---|---|---|---|
| | Flow amount (L/min) | Introduced part | Sparks in taking out | Electrostatic capacity (F/g) | Electrostatic capacity (F/cc) | Electrode density (g/cc) |
| Example 1 | 1 | Introducing line | None | 34.8 | 32.7 | 0.94 |
| Comparative Example 1 | — | — | Sparks | 33.6 | 32.9 | 0.98 |
| Comparative Example 2 | 1 | Gas introducing port | None | 28.0 | 26.6 | 0.96 |

INDUSTRIAL APPLICABILITY

According to the present invention, alkali activation reaction can be carried out without substantially bringing an activator and a carbon precursor into contact with carbon dioxide gas, and therefore the activation reaction sufficiently advances. Further, alkali metals and alkali metal compounds produced can efficiently be converted into safe carbonates. The present invention can be applied to stable and safe industrial production of carbon materials which are suited to production of an EDLC electrode having a high electrostatic capacity.

What is claimed is:

1. A production process for a carbon material comprising an alkali activation reaction step in which a mixture of a carbon precursor and an activator selected from alkali metal compounds is heated under a flow of inert gas in an alkali activation reaction region, wherein an alkali activation reaction of the alkali activation reaction step is carried out while allowing carbon dioxide gas to flow to a downstream part of said alkali activation reaction region on the condition that the carbon dioxide gas is not brought into contact with said carbon precursor and said activator in the alkali activation reaction region, so as to avoid the carbon dioxide gas contacting the carbon precursor and the activator in the alkali activation reaction region, and wherein baffle plates are arranged in a downstream part of said alkali activation reaction region to control a flow amount of the carbon dioxide gas so that the carbon dioxide gas is not brought into contact with said carbon precursor and said activator.

2. The production process for a carbon material as described in claim 1, wherein the flow amount of said carbon dioxide gas is 0.01 to 200% based on a flow amount of said inert gas.

3. The production process for a carbon material as described in claim 1, wherein the carbon dioxide gas is introduced either from an outside tube or an inside tube of a double tube into a downstream part of said alkali activation reaction region, and said inert gas and said carbon dioxide gas are exhausted from the other tube of the double tube.

4. The production process for a carbon material as described in claim 3, wherein the baffle plates are arranged in an inside of one tube into which the carbon dioxide gas is introduced in the double tube to control the flow amount of the carbon dioxide gas so that the carbon dioxide gas is not brought into contact with said carbon precursor and said activator.

5. The production process for a carbon material as described in claim 3, wherein said mixture of the carbon precursor and the activator is arranged in a rotary kiln furnace, and said alkali activation reaction is carried out while rotating said rotary kiln furnace around a shaft which is said double tube having a rotary joint structure.

6. The production process for a carbon material as described in claim 1, wherein said carbon precursor is produced by thermally treating pitch obtained by polymerizing condensed polycyclic hydrocarbon or a material containing the same under the presence of hydrogen fluoride and boron trifluoride.

7. The production process for a carbon material as described in claim 1, wherein said carbon precursor is produced by a process comprising a step in which a raw material for the carbon precursor is supplied to heat treating equipment in which plural media having a true density of 2 $g/cm^3$ or more flows, to thermally treat said raw material at a temperature of 400 to 800° C. to obtain a carbonized product, and in which said carbonized product is adhered onto said plural media.

8. The production process for a carbon material as described in claim 1, wherein the carbon dioxide gas does not flow into the alkali activation reaction region.

9. The production process for a carbon material as described in claim 1, wherein a direction of flow of the inert gas is opposite a direction of flow of the carbon dioxide gas.

* * * * *